United States Patent
Kehayas et al.

(10) Patent No.: US 10,897,117 B1
(45) Date of Patent: Jan. 19, 2021

(54) FIBER AMPLIFIER SYSTEM WITH VARIABLE COMMUNICATION CHANNEL CAPACITIES

(71) Applicant: Gooch and Housego PLC, Somerset (GB)

(72) Inventors: Efstratios Kehayas, Newton Abbot (GB); Leontios Stampoulidis, Torquay (GB)

(73) Assignee: GOOCH AND HOUSEGO PLC, Somerset (GB)

( * ) Notice: Subject to any disclaimer, the term of this patent is extended or adjusted under 35 U.S.C. 154(b) by 422 days.

(21) Appl. No.: 15/974,808

(22) Filed: May 9, 2018

Related U.S. Application Data

(60) Provisional application No. 62/505,372, filed on May 12, 2017.

(51) Int. Cl.
| | | |
|---|---|---|
| *H01S 3/067* | (2006.01) | |
| *G02B 27/30* | (2006.01) | |
| *H01S 3/10* | (2006.01) | |
| *H01S 3/00* | (2006.01) | |

(52) U.S. Cl.
CPC .......... *H01S 3/06754* (2013.01); *G02B 27/30* (2013.01); *H01S 3/0085* (2013.01); *H01S 3/06712* (2013.01); *H01S 3/10023* (2013.01)

(58) Field of Classification Search
CPC .. H01S 3/06754; H01S 3/06758; G02B 27/30
See application file for complete search history.

(56) References Cited

U.S. PATENT DOCUMENTS

| | | | | |
|---|---|---|---|---|
| 5,694,408 A | * | 12/1997 | Bott ...................... | H01S 3/2383 372/108 |
| 5,777,768 A | * | 7/1998 | Korevaar ........... | H04B 10/1127 398/129 |
| 6,556,324 B1 | * | 4/2003 | Meier .................. | H04B 10/118 398/121 |
| 6,614,591 B1 | * | 9/2003 | Cooper ..................... | H01S 5/50 359/349 |

(Continued)

OTHER PUBLICATIONS

Christopher Schmidt et al, "Osiris Payload for DLR's BiFROS Satellite", Optical Communications Group, Institute for Communications and Navigation, German Aerospace Center (DLR) Webling, Germany, Jan. 2014, 7 pages, Proc. of International Conference on Space Optical Systems and Applications (ICSOS), Kobe, Japan 2014.

*Primary Examiner* — Eric L Bolda
(74) *Attorney, Agent, or Firm* — Jetter & Associates, P.A.

(57) ABSTRACT

A multi-path optical amplification system includes a modulated light source emitting λ1 modulated light, a first signal splitter coupled to receive the modulated λ1 light providing a first λ1 modulated light signal and second λ1 modulated light signal. A first optical amplifier is for receiving the first λ1 modulated light signal and generating a first amplified output signal, and a second optical amplifier is for receiving the second λ1 modulated light signal and generating a second amplified output signal. A first collimator assembly is coupled to receive the first amplified output signal and provide a first output beam having a first beam divergence (D1) and a second collimator assembly is coupled to receive the second amplified output signal and provide a second output beam having a second beam divergence (D2).

11 Claims, 6 Drawing Sheets

(56) References Cited

U.S. PATENT DOCUMENTS

| | | | | |
|---|---|---|---|---|
| 6,839,520 | B1* | 1/2005 | Dreischer | H04B 10/118 |
| | | | | 398/121 |
| 9,690,107 | B2* | 6/2017 | Negoita | G02B 27/1073 |
| 2003/0193711 | A1* | 10/2003 | Hildebrand | H04B 10/118 |
| | | | | 359/333 |
| 2007/0031151 | A1* | 2/2007 | Cunningham | H04B 10/1123 |
| | | | | 398/131 |
| 2011/0274432 | A1* | 11/2011 | Cunningham | H04B 10/112 |
| | | | | 398/96 |
| 2016/0165325 | A1* | 6/2016 | Coleman | H04B 10/503 |
| | | | | 398/45 |
| 2017/0063461 | A1* | 3/2017 | Prucnal | H04B 10/25752 |

* cited by examiner

FIBER AMPLIFIER SYSTEM WITH VARIABLE COMMUNICATION CHANNEL CAPACITIES

CROSS REFERENCE TO RELATED APPLICATIONS

This application claims the benefit of Provisional Application Ser. No. 62/505,372 entitled "FIBER AMPLIFIER SYSTEM WITH VARIABLE COMMUNICATION CHANNEL CAPACITIES", filed on May 12, 2017, which is herein incorporated by reference in its entirety.

FIELD

Disclosed embodiments relate to fiber amplifiers that can efficiently enable different channel capacities such as bit-rate, distance or elevation combinations, such as for free-space optical communication systems.

BACKGROUND

Free-space optical communications (FSOC) is a telecommunication technology which uses light beams propagating in free-space to transmit data between two points. In addition to terrestrial point-to-point networks, FSOC can be used for building space-based links between satellites, unmanned aerial vehicles (UAVs), high-altitude platforms (HAPS), or from satellites/UAVs/HAPS to ground. The wavelength used can be within the visible or the infrared spectrum.

In a typical one-way laser communication system between two aerial platforms or spacecrafts or a combination of the two, laser terminals are deployed at each end, one capable of transmitting and one capable of receiving the optical signal. In bi-directional optical links, a transmitter and a receiver sub-system is deployed at both sides of the link. In the case of air and/or satellite to ground links, a transmitter laser terminal is deployed on-board the spacecraft and communication is achieved with mobile or stationary optical ground stations.

Typical laser communication terminals (LCTs) employ a laser transmitter, an optical amplifier and a collimator assembly. Combination of the above sub-systems can lead to free-space communication systems with different channel bandwidths, maximum distances and elevation angles. Different laser transmitter designs can extend the modulation bit-rate and signal fidelity levels, different amplifiers can enable longer range communication links and use of different collimator assemblies with divergence angles, which can support different channel capacities.

Due to the narrow laser beam, link acquisition and tracking between the two laser terminals is required using either closed or open loop control schemes. In some cases, optical beacons at various wavelengths are used for link acquisition before down/up-linking commences.

Laser terminals deployed on aerial platforms and spacecrafts can be made to support optical links with different performance by either operating the terminal sub-systems at different operational regimes or by actually using different hardware within the terminal. A latter case is when multiple optical assemblies are used to provide different divergence angles in order to support different operational profiles of the terminal in terms of bit-rate, distance or elevation. In this case, as hardware replication is required, and it is important for the overall laser terminal design to be configured to not limit performance and to minimally impact size, weight and power (SWaP).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for known free-space communication systems that support multiple links with variable performance which employ beams with different divergence angles and share the same amplifier sub-system, each optical signal needs to be completely spatially separated due to the inability to enable and disable one or the other independently. As used herein the term "signal" refers to light that is being waveguided (i.e. while being guided in the fiber), while the term "beam" refers to the signal after it has emerged from the fiber portion (e.g., output by the collimator assembly). In addition, as used herein when there are different beam divergences such as the first beam divergence D1 being different from a second beam divergence D2, the divergence difference means a minimum D difference of at least 5 µrad, typically being a difference of at least 50 µrad, such as at least 100 µrad.

Since both signals are always present in the link, the optical system has the problem of being inherently sensitive to spatial cross-talk between the two signals, adding to system complexity, cost, whilst increasing overall power consumption. A derivative requirement that adds to complexity of this known arrangement is the need for dedicated telescope assemblies per optical signal having different divergence angles.

Disclosed embodiments include a multi-path optical amplification system that comprises a modulated light source emitting λ1 modulated light, a first signal splitter coupled to receive the modulated λ1 light providing a first λ1 modulated light signal and second λ1 modulated light signal. A first optical amplifier is for receiving the first λ1 modulated light signal and generating a first amplified output signal, and a second optical amplifier is for receiving the second λ1 modulated light signal and generating a second amplified output signal. A first collimator assembly is coupled to receive the first amplified output signal and provide a first output beam having a first beam divergence (D1) and a second collimator assembly is coupled to receive the second amplified output signal and provide a second output beam having a second beam divergence (D2).

BRIEF DESCRIPTION OF THE DRAWINGS

Reference will now be made to the accompanying drawings, which are not necessarily drawn to scale, wherein.

DETAILED DESCRIPTION

Figure 1:
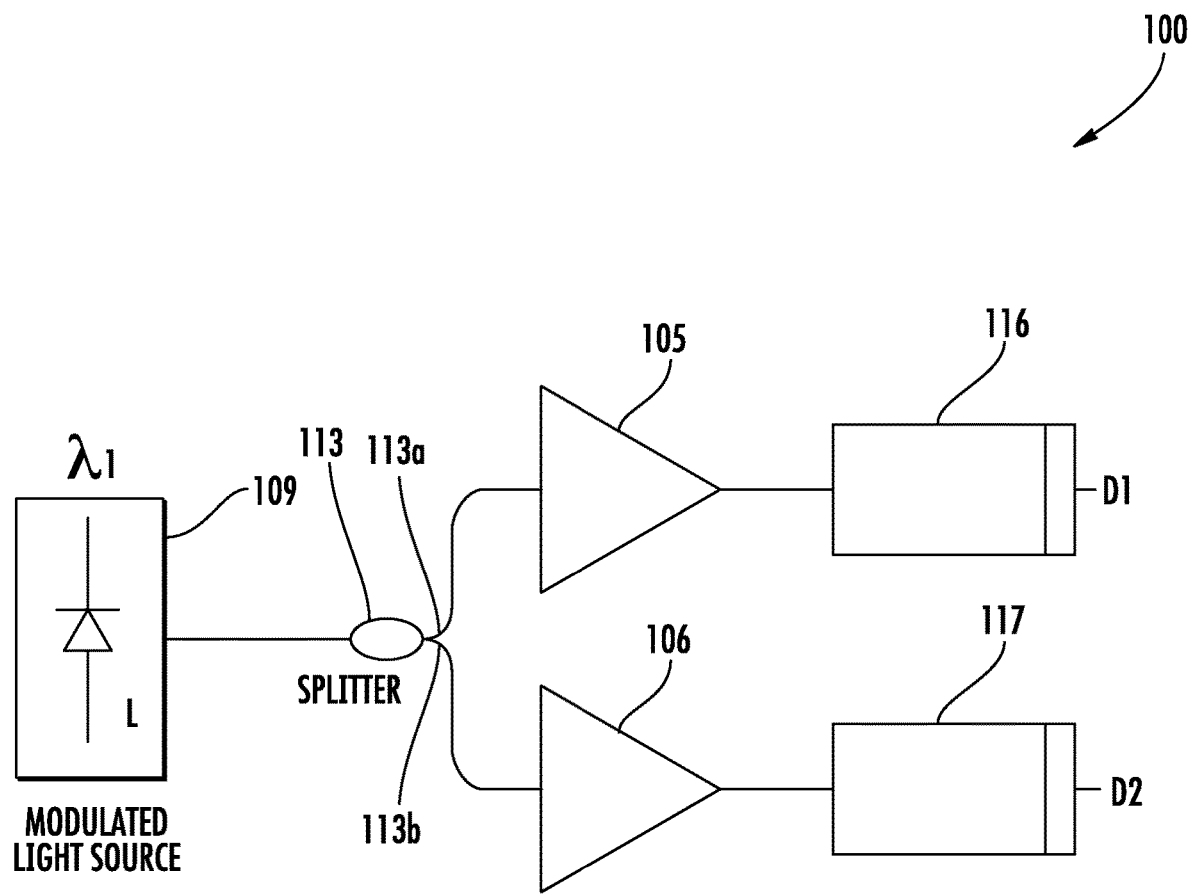
FIG. 1 shows an example multi-path optical amplification system with two amplifiers and two collimator assemblies that have different divergence angles thus providing a laser communication system with different beam qualities, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Disclosed embodiments provide a solution for free-space communication systems designed to support multiple channel capacities and the need to transmit beams with different divergence angles, by eliminating the spatial cross-talk problem between the signals and allowing sharing of a common telescope for all transmitting signals, whilst arriving at a more power efficient design. This is achieved by having a multi-channel fiber amplifier array comprising a first and at least a second path (channels) each including an Independent amplifier, which feed separate collimator assemblies that comprise several optical elements. The optical elements include one or more lenses, curved mirrors, prisms, beam splitters, dichroic filters, and/or polarization splitters depending on the specific design with each collimator assembly providing a different beam divergence angle.

The different divergence angles can provide a variation in performance with respect to bandwidth, distance, elevation or enable different acquisition methods, including open or closed loop between a space/aerial terminal and ground. For example, in satellite constellation scenarios, where intersatellite links can have varying distances, a beam with a higher divergence angle may be chosen to be transmitted when two satellites are flying closer to each other, but a beam with a smaller divergence angle can be selected when the satellites are flying further apart, as in the case of certain LEO constellation types. In another example, a variation in atmospheric conditions will effectively alter the channel capacity, causing a drop in the performance of the laser link and hence inducing an unacceptable increase in bit-error-rate, causing information loss. In this scenario, one way to maintain the laser link would be to switch to an open-loop acquisition with a lower information rate and correspondingly larger divergence angle.

The laser source for the multi-channel fiber amplifiers is generally a laser transmitter with a modulator to provide data signals, or can be a directly modulated laser. For disclosed wavelength multiplexing, there can be two laser sources operating at different wavelengths. A single laser source can also be shared in the case of polarization multiplexing. In either multiplexing case, the output of the two collimator assemblies can be routed/guided into the same shared telescope.

Disclosed fiber amplifier array configurations thus generate multiple beams with different divergence angles so that there is no longer the conventional need for spatial separation of signals through to dedicated telescopes and hence no need to operate a single power amplifier at the aggregate power level required to amplify all signals simultaneously. Accordingly, issues related to signal isolation and crosstalk from spatial beam overlap in free-space communication systems with multiple signals are avoided and the laser terminal system is inherently more power-efficient.

FIG. 1 shows an example multi-path optical amplification system 100 having with two amplifiers and two collimator assemblies with different divergence angles thus providing a laser communication system with different beam qualities, according to an example embodiment. System 100 includes a first modulated light source 109 (e.g., a modulated laser diode) for emitting modulated light at a first wavelength ($\lambda 1$ modulated light). A first signal splitter 113 has an input coupled to receive the $\lambda 1$ modulated light having a first split output 113a providing a first $\lambda 1$ modulated light signal and a second split output 113b providing a second $\lambda 1$ modulated light signal.

A first optical path includes first optical amplifier 105 (e.g., a rare earth (RE) doped fiber amplifier) having a first amplifier input for receiving the first $\lambda 1$ modulated light signal and generating a first amplified output signal, and a second optical path including a second optical amplifier 106 having a second amplifier input for receiving the second $\lambda 1$ modulated light signal and generating a second amplified output signal. As known in the art doped fiber amplifiers (DFAs) are optical amplifiers that use a doped optical fiber as a gain medium to amplify an optical signal, where the signal to be amplified and a light from a pump laser are multiplexed into the doped fiber, and the signal is amplified through interaction with the doping ions.

The optical amplifiers 105 and 106 can also comprise cladding-pumped fiber amplifiers. In this embodiment the doped fiber can comprise a double-clad fiber including a doped core and an inner cladding, where the system further comprises optics for launching the optical signal into the doped core and optics for launching light into the inner cladding. The signal light is thus launched into the doped core, while the pump light is launched into the inner cladding. As known in the art, the amplifier core can be D-shaped for more efficient pump light absorption.

The optical amplifiers 105, 106 can also be integrated devices such as Semiconductor Optical Amplifiers where gain is provided by electrically pumping a compound semiconductor material with a direct bandgap. The amplifiers 105, 106 can be discrete devices or co-packaged into a single device monolithically, or be provided by using hybrid integration methods.

A first collimator assembly 116 has a first collimating input coupled to receive the first amplified output signal and provide a first output beam having a first beam divergence (D1). A second collimator assembly 117 has a second collimating input coupled to receive the second amplified output signal and provide a second output beam having a second beam divergence (D2). D1 is different from D2. As known in the art conventional fiber optic collimators employ plano-convex lenses positioned at their focal length from the optical fiber tip and include SMA female connectors for ease of coupling to standard fiber optic cable. For light exiting from an optical fiber, the collimator expands the beam (radius or diameter) and decreases the divergence by the ratio of the fiber core diameter to the collimator aperture, where the product of beam radius and divergence angle is a constant.

Figure 2:
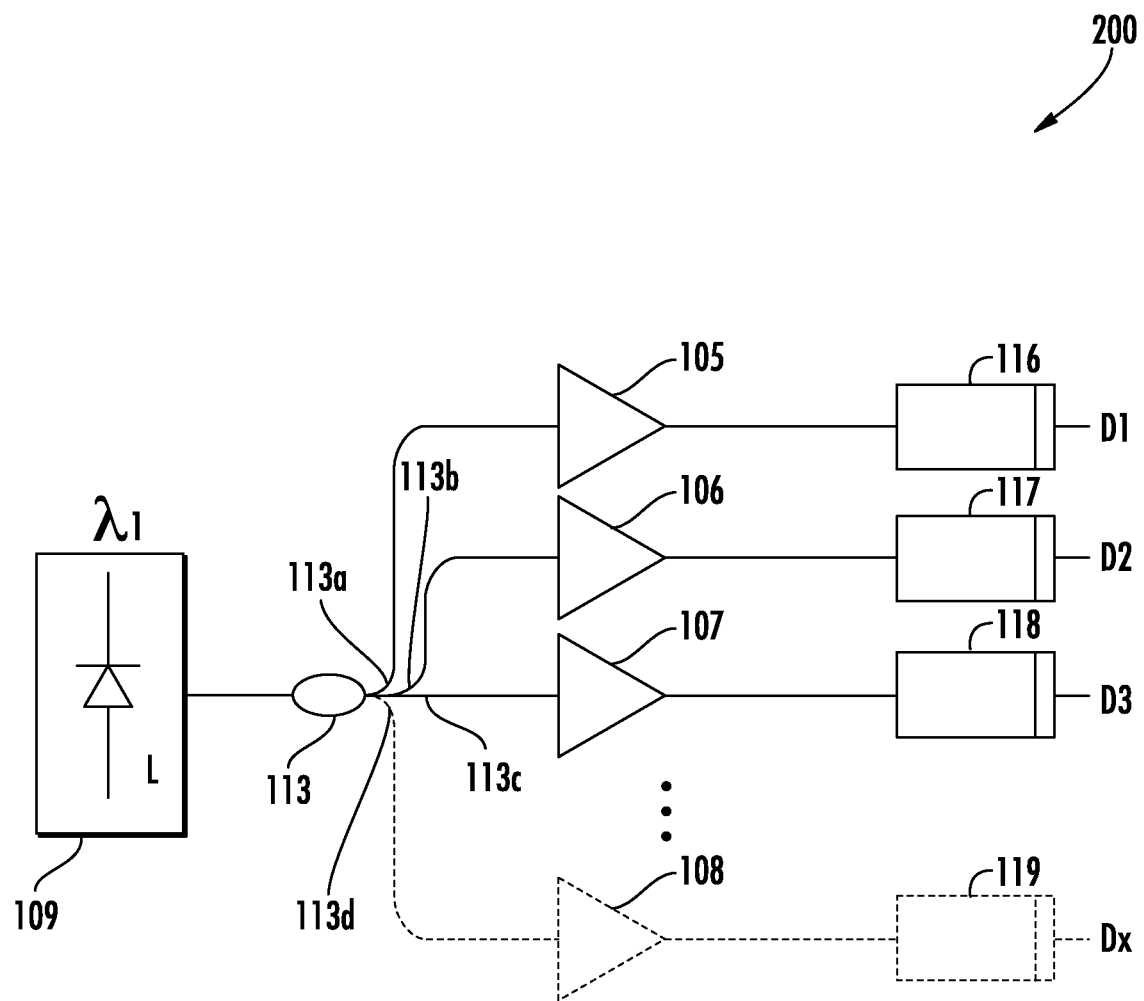
FIG. 2 shows another example multi-path optical amplification system that comprises an extension of the FIG. 1 system to an array of N>2 amplifiers, according to an example embodiment.

FIG. 2 shows another example multi-path optical amplification system 200 that comprises an extension of the FIG.

1 system to an array of N>2 amplifiers, shown with amplifiers 105, 106, 107 and 108, according to an example embodiment. The convention used throughout herein for the optical amplifiers is the amplifier number refers to collimator assembly being fed, so that the first optical amplifier 105 feeds the first collimator assembly 116, the second optical amplifier 106 feeds the second collimator assembly 117, the third optical amplifier 107 feeds the third collimator assembly 118, and the fourth optical amplifier 108 feeds the fourth collimator assembly 118. For embodiments such as in FIGS. 3, 4, 5A and 5B described below, where additional amplifiers (in parallel) feed the same collimator assembly, the amplifiers receive an extra "a" after the reference number for first additional amplifier, and "b" for a second additional amplifier, so for example that the second color first optical amplifier 105a in FIG. 4 feeds the same collimator assembly (the first collimator assembly 116) as the first optical amplifier 105.

In this embodiment the first signal splitter 113 further provides a third split output 113c and a fourth split output 113d. System 200 includes at least a third optical path including a third optical amplifier 107 having a third amplifier input for receiving a third modulated light signal from the third split output 113c of the first signal splitter 113 for generating a third amplified output signal, and a third collimator assembly 118 having a third collimating input coupled to receive the third amplified output signal and providing a third output beam having a third beam divergence (D3).

System 200 is shown also including a fourth optical amplifier 108 having an amplifier input for receiving a fourth modulated light signal from the fourth split output 113d of the first signal splitter 113 for generating a fourth amplified output signal, and a fourth collimator assembly 119 having a fourth collimating input coupled to receive the fourth amplified output signal and providing a fourth output beam having a fourth beam divergence shown as DX. D1, D2, D3 and DX are different from one another.

Figure 3:
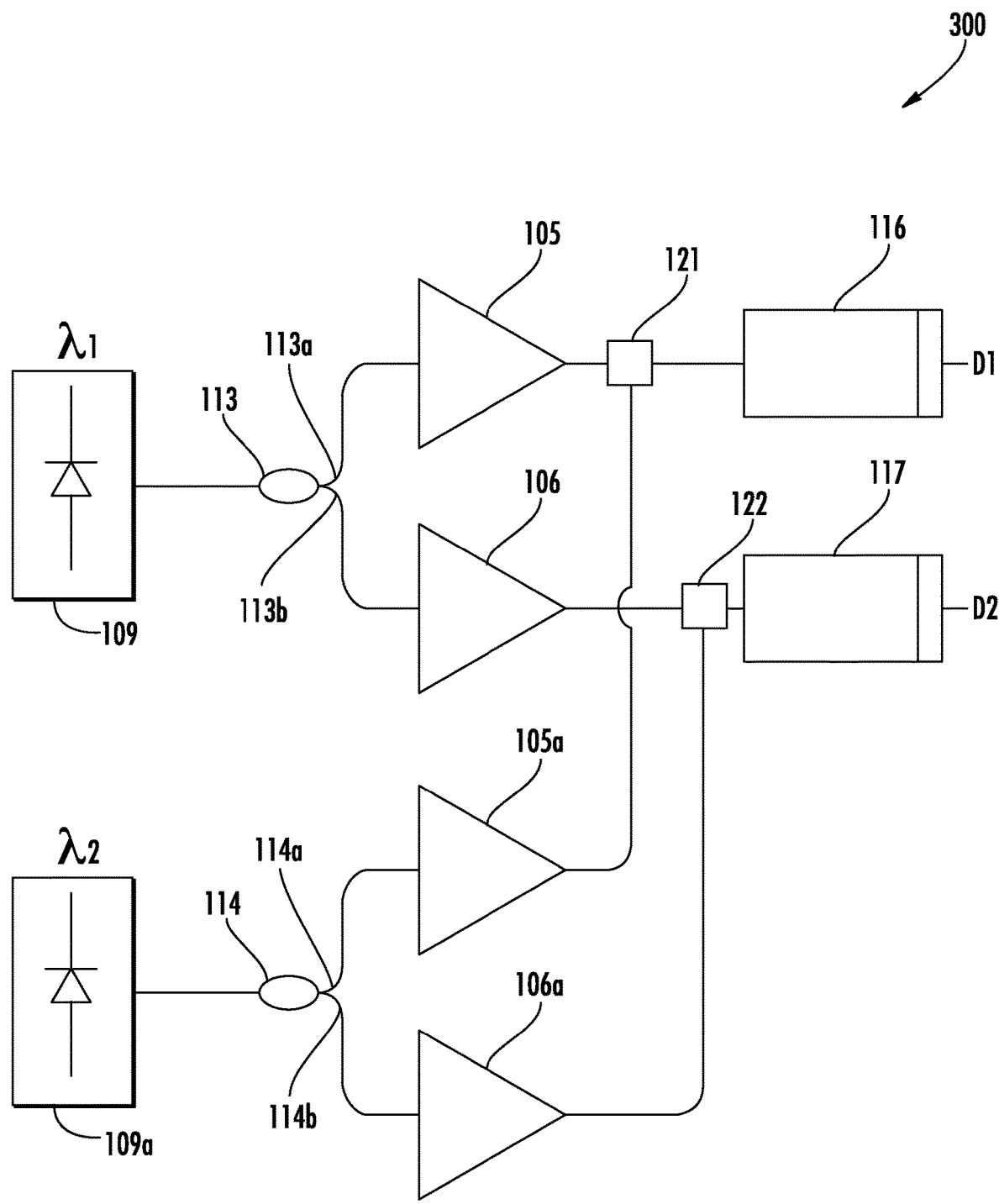
FIG. 3 shows a multi-wavelength system which multiplexes two colors on each of the collimator assemblies, according to an example embodiment.

FIG. 3 shows a multi-wavelength system 300 which multiplexes two colors on each collimator assembly, according to an example embodiment. System 300 includes a second modulated light source 109a for emitting modulated light at a second wavelength (λ2 modulated light) that is at a wavelength different from λ1. A second signal splitter 114 has an input coupled to receive the λ2 modulated light having a first split output 114a providing a first λ2 modulated light signal and a second split output 114b providing a second λ2 modulated light signal. A third optical path includes a second color first optical amplifier 105a having a third amplifier input for receiving the first λ2 modulated light signal and generating a third amplified output signal, and a fourth optical path is shown including a second color second optical amplifier 106a having a fourth amplifier input for receiving the second λ2 modulated light signal and generating a fourth amplified output signal.

A first signal combiner 121 is between both the first optical amplifier 105 (processing the first color) and the second color first optical amplifier 105a (processing the second color) and the first collimator assembly 116, and a second signal combiner 122 is between both the second optical amplifier 106 (processing the first color) and the second color second optical amplifier 106a (processing the second color) and the second collimator assembly 117.

Figure 4:
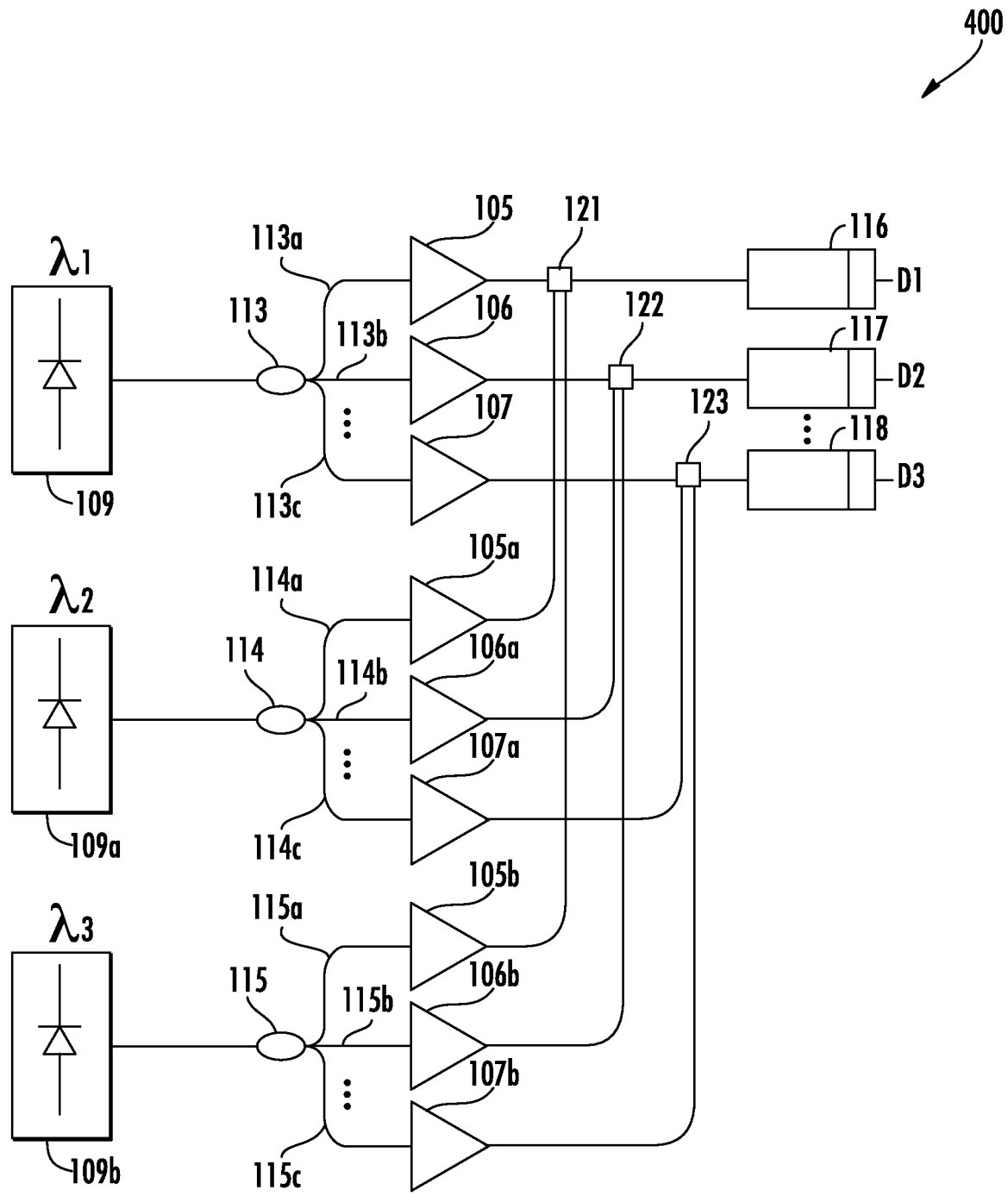
FIG. 4 shows a generalized multi-path optical amplification system having N different spatial channels with M number of different wavelengths in each channel.

FIG. 4 shows a generalized multi-path optical amplification system 400 having N different spatial channels with M number of wavelength in each channel. This embodiment is shown adding components to system 300 shown in FIG. 3 so that the first signal splitter 113 further provides a third split output providing a third λ1 modulated light signal coupled to a third optical amplifier 107 having a third amplifier input for receiving the third λ1 modulated light signal for generating a third λ1 amplified output signal, and the second signal splitter 114 further provides a third split output providing a third λ2 modulated light signal coupled to a second color third optical amplifier 107a having an amplifier input for receiving the third λ2 modulated light signal for generating a third λ2 amplified output signal.

Also added is a third modulated light source 109b and a third signal splitter 115, where the signal splitters are all 3 way splitters, a third signal combiner 123 and a third collimator assembly 118. The third modulated light source 109b is for emitting modulated light at a third wavelength (λ3 modulated light) different from λ1 and λ2 that is coupled to the third signal splitter 115 having an input coupled to receive the λ3 modulated light having a first split output 115a providing a first λ3 modulated light signal, a second split output 115b providing a second λ3 modulated light signal, and a third split output 115c providing a third λ3 modulated light signal. A third color first optical amplifier 105b has an amplifier input for receiving the first λ3 modulated light signal, an third color second optical amplifier 106b has an amplifier input for receiving the second λ3 modulated light signal and a third color third optical amplifier 107b has an amplifier input for receiving the third λ3 modulated light signal.

The first signal splitter 113 further provides a third split output 113c providing a third λ1 modulated light signal, and the second signal splitter 114 further provides a third split output 114c providing a third λ2 modulated light signal. A third collimator assembly 118 having a third collimating input is coupled to receive the third λ1, λ2 and λ3 modulated light signals and is for providing a third output beam having a divergence D3 which is different from D1 and D2. A third signal combiner 123 is between each of the third optical amplifier 107, second color third optical amplifier 107a, and third color third optical amplifier 107b and the third collimator assembly 118.

Figure 5A:
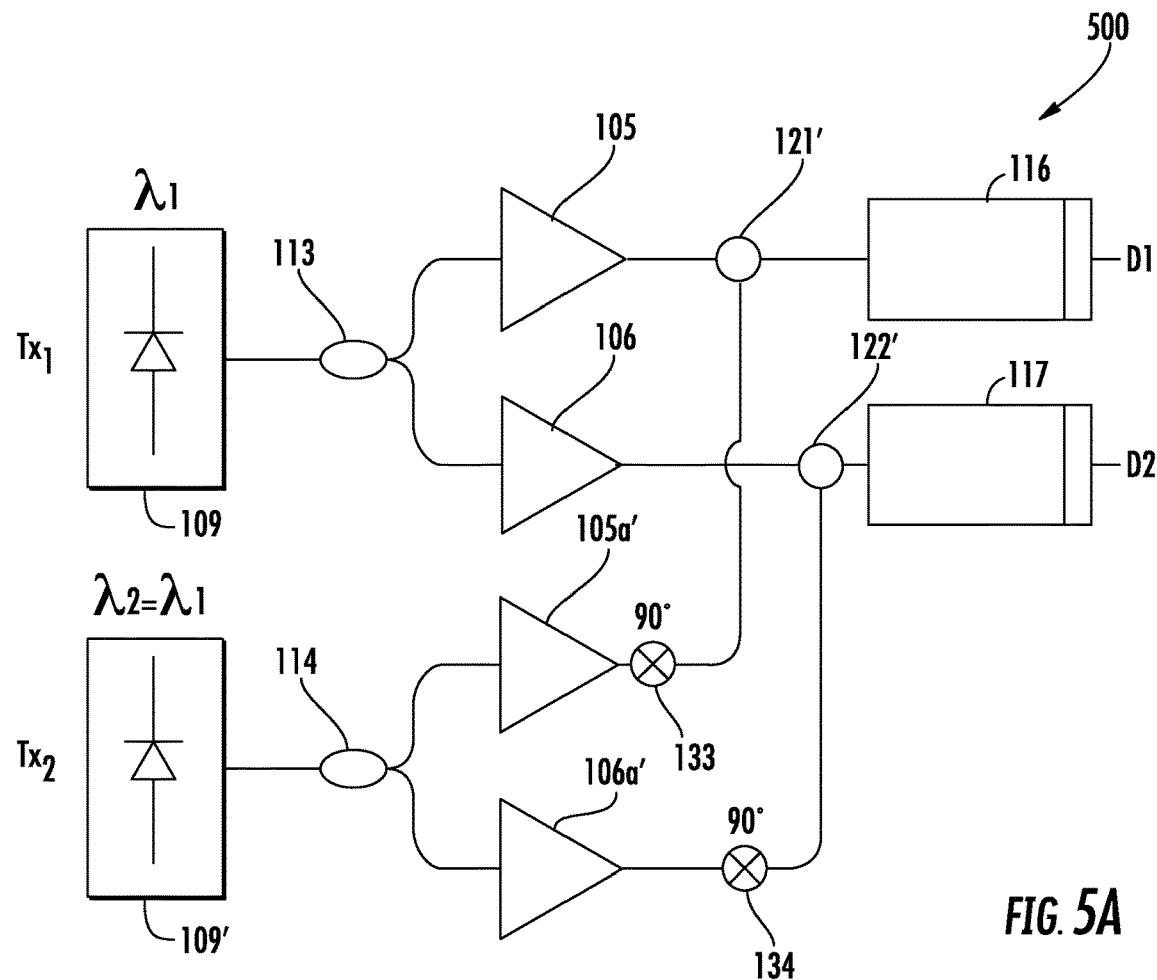
FIG. 5A shows an example polarization multiplexed optical amplification system, according to an example embodiment.

FIG. 5A shows an example polarization multiplexed optical amplification system 500, according to an example embodiment. This embodiment uses 2 modulated light sources emitting at the same λ. The first and second optical paths as all optical fiber paths in disclosed polarization multiplexed optical amplification systems include polarization maintaining (PM) fiber throughout. A second modulated light source 109' is provided for emitting modulated light also at λ1 (second λ1' modulated light). A second signal splitter 114 has an input coupled to receive the second λ1' modulated light having a first split output providing a first λ1' modulated light signal and a second split output providing a second λ1' modulated light signal.

System 500 includes a third optical path Including a third optical amplifier 105a' having a third amplifier input for receiving the first λ1' modulated light signal and generating a third amplified output signal, and a fourth optical path including a fourth optical amplifier 106a' having a fourth amplifier input for receiving the second λ1' modulated light signal and generating a fourth amplified output signal. A first polarization rotator 133 is coupled to rotate the third amplified output signal, and a second polarization rotator 134 is coupled to rotate the fourth amplified output signal.

The polarization rotators 133, 134 rotate the light polarization of received light by 90 degrees. The polarization rotator can be in its simplest form implemented as a 90 degree splice joint between the PM fibers. The polarization rotators 133, 134 can also comprise Faraday rotators. Going through a polarization rotator the polarization of light will be converted from the slow axis to fast axis or vice versa.

A first polarization signal combiner 121' has inputs coupled to receive the first amplified output signal and the third amplified output signal and provide a multiplex output that is coupled to an input of the first collimator assembly 116. A polarization signal combiner 122' has inputs coupled to receive the second output signal and fourth amplified output signal and provide a multiplex output that is coupled to an input of the second collimator assembly 117. During normal operation of system 500, only one pair of amplifiers (105 and 105a, or 106 and 106a) will be operating and hence light from either the first collimator assembly 116 or second collimator assembly 117 will be emitted by the system 500, but not from both amplifier pairs and collimator assemblies to avoid interference at the collimator assembly and receiver.

Figure 5B:
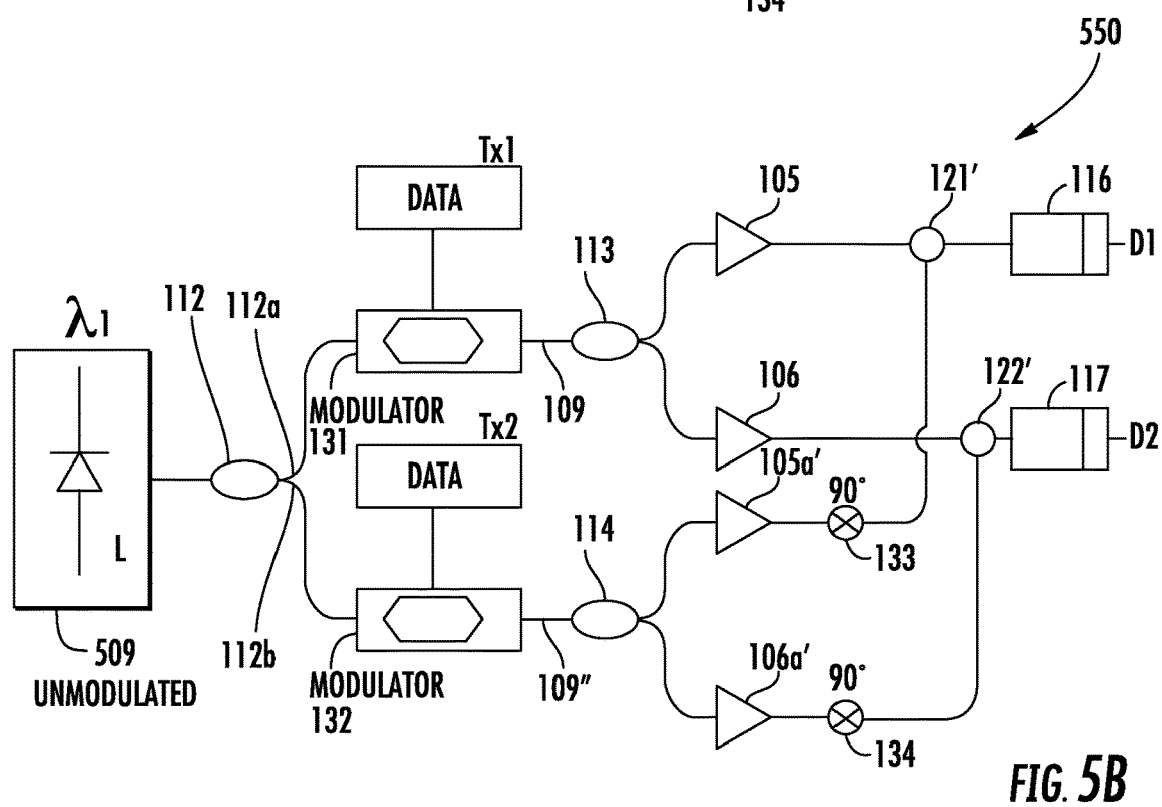
FIG. 5B shows another example polarization multiplexed optical amplification system, according to an example embodiment.

FIG. 5B shows another example polarization multiplexed optical amplification system 550, according to an example embodiment. In this embodiment, there is a single light source, which has its light split and then independently modulated. In this embodiment the first modulated light source 109 comprises an unmodulated light source 509 having an output coupled to a 1:4 four signal splitter 112, which provides a first split output 112a providing a first unmodulated signal coupled to a first modulator 131 that is coupled to the first signal splitter 113. The fourth signal splitter 112 further provides a second split output 112b that is coupled to a second modulator 132 that provides another λ1 modulated light source 109" emitting λ1" modulated light that is coupled to a second signal splitter 114 providing a first λ1" modulated light signal and a second split output providing a second λ1" modulated light signal.

A third optical path includes a rotator feeding first optical amplifier 105a' having a third amplifier input for receiving the λ1" modulated light beam and generating a third amplified output signal, and a fourth optical path including a rotator feeding second optical amplifier 106a' has a fourth amplifier input for receiving the second λ1" modulated light signal and for generating a fourth amplified output signal. A first polarization rotator 133 is coupled to rotate the third amplified output signal, and a second polarization rotator 134 is coupled to rotate the fourth amplified output signal. A first polarization signal combiner 121' has inputs coupled to receive the first amplified output signal and the third amplified output signal and provide a multiplex output that is coupled to an input of the first collimator assembly 116. A polarization signal combiner 122 has inputs coupled to receive the second amplified output signal and the fourth amplified output signal and provide a multiplex output that is coupled to an input of the second collimator assembly 117.

Figure 6:
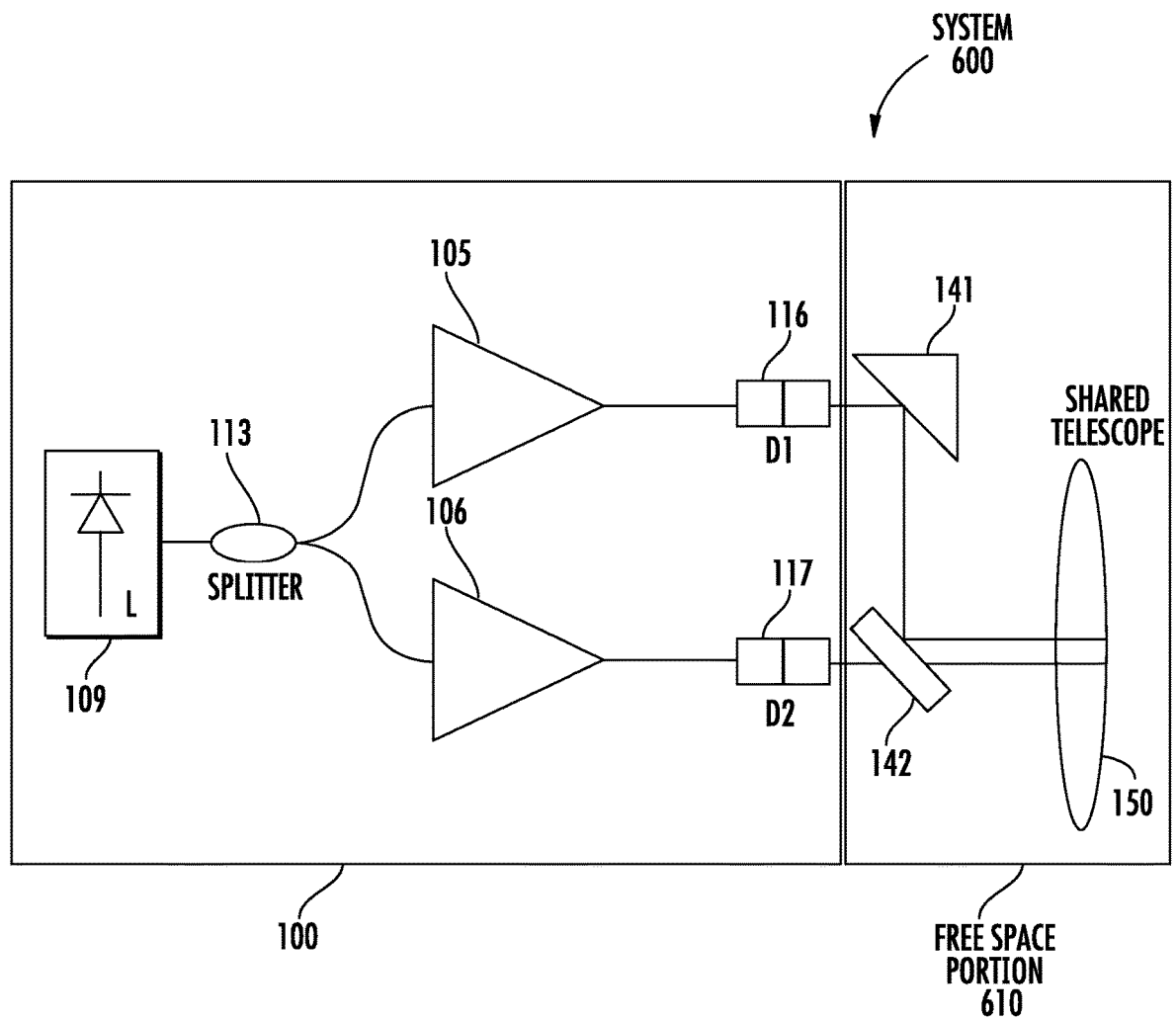
FIG. 6 shows an example free-space communications system including a disclosed multi-path optical amplification system having its respective outputs coupled to a shared telescope, according to an example embodiment.

FIG. 6 shows an example free-space communications system 600 including the example multi-path optical amplification system shown as system 100 in FIG. 1 having its outputs coupled into a free-space optics portion 610 including a shared telescope 150. The exact implementation of the free-space optics portion 610 is only shown as an example. Free-space optics portion 610 is shown including a mirror 141 coupled to reflect the first output beam toward a beam combiner 142 that is also in a path of the second output beam for combining the first and second output beam at an input face of the shared telescope 150. In this embodiment, the free-space communications system 600 uses a single data channel as shown in FIG. 6 to create two independent transmission systems that have different performance characteristics such as in propagation properties of the beam beyond the divergence angle (e.g., beam size and wavefront shape in a static or dynamic way). The different performance characteristics can be accomplished by incorporating different free-space optical lens designs or by incorporating adaptive optics techniques, respectively. Disclosed free-space communications systems can be used in a variety of different system arrangements. For example, space to ground, air to ground, and air to space communications.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, disclosed multi-path amplification systems can be embodied as free-space implementations where the optical amplifier is constructed using free-space optical elements, with the active fiber replaced by a solid state gain medium, the wavelength-division multiplexing (WDM) coupler replaced with a dichroic signal splitter, and the signal splitter replaced with a waveplate.

In addition, while a particular feature may have been disclosed with respect to only one of several implementations, such feature may be combined with one or more other features of the other implementations as may be desired and advantageous for any given or particular application. Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. A multi-path optical amplification system, comprising:
   a first modulated light source for emitting modulated light at a first wavelength (λ1 modulated light);
   a second modulated light source for emitting modulated light at a second wavelength (λ2 modulated light) different from said λ1 modulated light;
   a first signal splitter with an input coupled to receive said λ1 modulated light having a first split output providing a first λ1 modulated light signal and a second split output providing a second λ1 modulated light signal;
   a second signal splitter with an input coupled to receive said λ2 modulated light having a first split output providing a first λ2 modulated light signal and a second split output providing a second λ2 modulated light signal;
   an optical path including a first optical amplifier having a first amplifier input for receiving said first λ1 modulated light signal and generating a first amplified output signal, a second optical amplifier having a second amplifier input for receiving said second λ1 modulated light signal and generating a second amplified output signal;

a first optical amplifier for amplifying a second color having a third amplifier input for receiving said first $\lambda 2$ modulated light signal and generating a third amplified output signal, and a second optical amplifier for amplifying the second color having a fourth amplifier input for receiving said second $\lambda 2$ modulated light signal and generating a fourth amplified output signal;

a first collimator assembly having a first input coupled to receive said first amplified output signal and provide a first output beam having a first beam divergence (D1), and a second collimator assembly having a second collimating input coupled to receive said second amplified output signal and provide a second output beam having a second beam divergence (D2), and a first signal combiner between both said first optical amplifier and said second optical amplifier and said first collimator assembly, and a second signal combiner between both said second optical amplifier and said second optical amplifier for amplifying the second color and said second collimator assembly;

wherein said D1 is different from said D2.

2. The optical amplification system of claim 1, further comprising a third optical amplifier having a third amplifier input for receiving a third modulated light signal from said first signal splitter for generating a third amplified output signal, and a third collimator assembly having a third collimating input coupled to receive said third amplified output signal and providing a third output beam having a third beam divergence (D3), wherein said D3 is different from said D1 and from said D2.

3. The optical amplification system of claim 1, wherein said first signal splitter further provides a third split output providing a third $\lambda 1$ modulated light signal coupled to a third optical amplifier having a third amplifier input for receiving said third $\lambda 1$ modulated light signal for generating a third $\lambda 1$ amplified output signal;

wherein said second signal splitter further provides a third split output providing a third $\lambda 2$ modulated light signal coupled to a third optical amplifier for amplifying the second color having an amplifier input for receiving said third $\lambda 2$ modulated light signal for generating a third $\lambda 2$ amplified output signal;

a third modulated light source for emitting modulated light at a third wavelength ($\lambda 3$ modulated light) different from said $\lambda 1$ and said $\lambda 2$ modulated light coupled to a third signal splitter with an input coupled to receive said $\lambda 3$ modulated light having a first split output providing a first $\lambda 3$ modulated light signal, a second split output providing a second $\lambda 3$ modulated light signal, and a third split output providing a third $\lambda 3$ modulated light signal;

a first optical amplifier for amplifying a third color having an amplifier input for receiving said first $\lambda 3$ modulated light signal for generating a first $\lambda 3$ amplified light signal, a second optical amplifier for amplifying the third color having an amplifier input for receiving said second $\lambda 3$ modulated light signal and for generating a second $\lambda 3$ amplified light signal, and a third optical amplifier for amplifying the third color having an amplifier input for receiving said third $\lambda 3$ modulated light signal and for generating a third $\lambda 3$ amplified light signal;

a third signal combiner between each of said third optical amplifiers and a third collimator assembly, said third collimator assembly having a third collimating input coupled to receive said third $\lambda 1$ amplified output signal, third $\lambda 2$ amplified output signal, and third $\lambda 3$ amplified light signal and providing a third output beam having a third beam divergence (D3) different from said D1 and said D2.

4. The optical amplification system of claim 1, wherein said first modulated light source comprises a light source having an output coupled to a fourth signal splitter which provides a first split output providing a first unmodulated signal coupled to a first modulator that is coupled to said first signal splitter;

said fourth signal splitter further providing a second split output that is coupled to a second modulator that provides another $\lambda 1$ modulated light source emitting $\lambda 1"$ modulated light that is coupled to a second signal splitter providing a first $\lambda 1"$ modulated light signal and a second split output providing a second $\lambda 1"$ modulated light signal;

a third optical amplifier having a third amplifier input for receiving said $\lambda 1"$ modulated light and generating a third amplified output signal, and a fourth optical amplifier having a fourth amplifier input for receiving said second $\lambda 1"$ modulated light signal and generating a fourth amplified output signal;

a first polarization rotator coupled to rotate said third amplified output signal, and a second polarization rotator coupled to rotate said fourth amplified output signal, a first polarization signal combiner having inputs coupled to receive said first amplified output signal and said third amplified output signal and provide a multiplex output that is coupled to an input of said first collimator assembly, and a second polarization signal combiner having inputs coupled to receive said second amplified output signal and said fourth amplified output signal and provide a multiplex output that is coupled to an input of said second collimator assembly.

5. The optical amplification system of claim 1, further comprising:

a second modulated light source for emitting modulated light at said $\lambda 1$ (second $\lambda 1'$ modulated light);

a second signal splitter with an input coupled to receive said second $\lambda 1'$ modulated light having a first split output providing a first $\lambda 1'$ modulated light signal and a second split output providing a second $\lambda 1'$ modulated light signal;

a third optical amplifier having a third amplifier input for receiving said first $\lambda 1'$ modulated light signal and generating a third amplified output signal, and fourth optical amplifier having a fourth amplifier input for receiving said second $\lambda 1'$ modulated light signal and generating a fourth amplified output signal, a first polarization rotator coupled to rotate said third amplified output signal, and a second polarization rotator coupled to rotate said fourth amplified output signal, a first polarization signal combiner having inputs coupled to receive said first amplified output signal and said third amplified output signal and provide a multiplex output that is coupled to an input of said first collimator assembly, and a polarization signal combiner having inputs coupled to receive said second amplified output signal and said fourth amplified output signal and provide a multiplex output that is coupled to an input of said second collimator assembly.

6. A free-space communications system, comprising:
a multi-path optical amplification system comprising:
a first modulated light source for emitting modulated light at a first wavelength ($\lambda 1$ modulated light);
a second modulated light source for emitting modulated light at a second wavelength ($\lambda 2$ modulated light) different from said $\lambda 1$ modulated light;
a first signal splitter with an input coupled to receive said $\lambda 1$ modulated light having a first split output providing a first $\lambda 1$ modulated light signal and a second split output providing a second $\lambda 1$ modulated light signal;
a second signal splitter with an input coupled to receive said $\lambda 2$ modulated light having a first split output providing a first $\lambda 2$ modulated light signal and a second split output providing a second $\lambda 2$ modulated light signal;
a first optical amplifier having a first amplifier input for receiving said first $\lambda 1$ modulated light signal and generating a first amplified output signal, and
a second optical amplifier having a second amplifier input for receiving said second $\lambda 1$ modulated light signal and generating a second amplified output signal;
a first optical amplifier for amplifying a second color having a third amplifier input for receiving said first $\lambda 2$ modulated light signal and generating a third amplified output signal, and a second optical amplifier for amplifying the second color having a fourth amplifier input for receiving said second $\lambda 2$ modulated light signal and generating a fourth amplified output signal;
a first collimator assembly having a first collimating input coupled to receive said first amplified output signal and provide a first output beam having a first beam divergence (D1), and
a second collimator assembly having a second collimating input coupled to receive said second amplified output signal and provide a second output beam having a second beam divergence (D2),
a first signal combiner between both said first optical amplifier and said second optical amplifier and said first collimator assembly, and a second signal combiner between both said second optical amplifier and said second color second optical amplifier for amplifying the second color and said second collimator assembly;
wherein said D1 is different from said D2, and
a free-space optics portion including a mirror coupled to reflect said first output beam toward a beam combiner that is in a path of said second output beam for combining said first output beam and said second output beam at an input of a single telescope.

7. The free-space communications system of claim 6, wherein said free-space optics portion further comprises optics for further inducing a change in a propagation property of said first output beam and said second output beam beyond said D1 and said D2.

8. The free-space communications system of claim 6, wherein said optical amplification system further comprises:
a third optical amplifier having a third amplifier input for receiving a third modulated light signal from said first signal splitter for generating a third amplified output signal, and a third collimator assembly having a third collimating input coupled to receive said third amplified output signal and providing a third output beam having a third beam divergence (D3),
wherein said D3 is different from said D1 and from said D2.

9. The free-space communications system of claim 6,
wherein said first signal splitter further provides a third split output providing a third $\lambda 1$ modulated light signal coupled to a third optical amplifier having a third amplifier input for receiving said third $\lambda 1$ modulated light signal for generating a third $\lambda 1$ amplified output signal;
wherein said second signal splitter further provides a third split output providing a third $\lambda 2$ modulated light signal coupled to a third optical amplifier for amplifying the second color having an amplifier input for receiving said third $\lambda 2$ modulated light signal for generating a third $\lambda 2$ amplified output signal;
a third modulated light source for emitting modulated light at a third wavelength ($\lambda 3$ modulated light) different from said $\lambda 1$ and said $\lambda 2$ modulated light coupled to a third signal splitter with an input coupled to receive said $\lambda 3$ modulated light having a first split output providing a first $\lambda 3$ modulated light signal, a second split output providing a second $\lambda 3$ modulated light signal, and a third split output providing a third $\lambda 3$ modulated light signal;
an optical amplifier having an amplifier input for receiving said first $\lambda 3$ modulated light signal,
a first optical amplifier for amplifying a third color having an amplifier input for receiving said first $\lambda 3$ modulated light signal for generating a first $\lambda 3$ amplified light signal, a second optical amplifier for amplifying the third color having an amplifier input for receiving said second $\lambda 3$ modulated light signal and for generating a second $\lambda 3$ amplified light signal, and a third optical amplifier for amplifying the third color having an amplifier input for receiving said third $\lambda 3$ modulated light signal and for generating a third $\lambda 3$ amplified light signal;
a third signal combiner between each of said third optical amplifiers and a third collimator assembly,
said third collimator assembly having a third collimating input coupled to receive said third $\lambda 1$ amplified output signal, third $\lambda 2$ amplified output signal, and third $\lambda 3$ amplified light signal and providing a third output beam having a third beam divergence (D3) different from said D1 and said D2.

10. The free-space communications system of claim 6,
wherein said optical amplification system further comprises:
said first modulated light source comprising a light source having an output coupled to a fourth signal splitter which provides a first split output providing a first unmodulated signal coupled to a first modulator that is coupled to said first signal splitter;
said fourth signal splitter further providing a second split output that is coupled to a second modulator that provides another $\lambda 1$ modulated light source emitting $\lambda 1"$ modulated light that is coupled to a second signal splitter providing a first $\lambda 1"$ modulated light signal and a second split output providing a second $\lambda 1"$ modulated light signal;
a third optical amplifier having a third amplifier input for receiving said $\lambda 1"$ modulated light and generating a third amplified output signal, and
a fourth optical amplifier having a fourth amplifier input for receiving said second $\lambda 1"$ modulated light signal and generating a fourth amplified output signal, a first polarization rotator coupled to rotate said third amplified output signal, and a second polarization rotator coupled to rotate said fourth amplified output signal, a first polarization signal combiner having inputs coupled to receive said first amplified output signal and said third amplified output signal and provide a multiplex output that is coupled to an input of said first collimator assembly, and a second polarization signal combiner having inputs coupled to receive said second amplified output signal and said fourth amplified output signal and provide a multiplex output that is coupled to an input of said second collimator assembly.

11. The free-space communications system of claim 6, wherein said optical amplification system further comprises:

a second modulated light source for emitting modulated light at said λ1 (second λ1' modulated light);

a second signal splitter with an input coupled to receive said second λ1' modulated light having a first split output providing a first λ1' modulated light signal and a second split output providing a second λ1' modulated light signal;

a third optical amplifier having a third amplifier input for receiving said first λ1' modulated light signal and generating a third amplified output signal, and a fourth optical amplifier having a fourth amplifier input for receiving said second λ1' modulated light signal and generating a fourth amplified output signal;

a first polarization rotator coupled to rotate said third amplified output signal, and a second polarization rotator coupled to rotate said fourth amplified output signal, a first polarization signal combiner having inputs coupled to receive said first amplified output signal and said third amplified output signal and provide a multiplex output that is coupled to an input of said first collimator assembly, and a polarization signal combiner having Inputs coupled to receive said second amplified output signal and said fourth amplified output signal and provide a multiplex output that is coupled to an input of said second collimator assembly.

* * * * *